United States Patent [19]

Poschmann et al.

[11] Patent Number: 4,628,437
[45] Date of Patent: Dec. 9, 1986

[54] TELECONTROL SYSTEM

[75] Inventors: Werner Poschmann, Renningen; Wolfgang Klenner, Ditzingen; Günter Wattach, Walzbachtal; Peter Maas, Pforzheim, all of Fed. Rep. of Germany

[73] Assignee: International Standard Electric Corporation, New York, N.Y.

[21] Appl. No.: 538,645

[22] Filed: Oct. 3, 1983

[30] Foreign Application Priority Data

Oct. 5, 1982 [DE] Fed. Rep. of Germany ....... 3236812

[51] Int. Cl.$^4$ .................. G08C 19/00; H04Q 9/00
[52] U.S. Cl. .................. 364/131; 364/138; 364/900
[58] Field of Search ... 364/200 MS File, 900 MS File, 364/131, 132, 138

[56] References Cited

U.S. PATENT DOCUMENTS

| 4,003,032 | 1/1977 | Austin et al. | 364/200 |
|---|---|---|---|
| 4,015,243 | 3/1977 | Kurpanek et al. | 364/200 |
| 4,158,227 | 6/1979 | Baxter et al. | 364/200 |
| 4,189,769 | 2/1980 | Cook et al. | 364/200 |
| 4,257,100 | 3/1981 | Syrbe et al. | 364/200 |
| 4,271,468 | 6/1981 | Christensen et al. | 364/200 |
| 4,293,909 | 10/1981 | Catiller et al. | 364/200 |
| 4,303,993 | 12/1981 | Panepinto, Jr. et al. | 364/200 |
| 4,334,307 | 6/1982 | Bourgeois et al. | 364/200 |
| 4,413,319 | 11/1983 | Schultz | 364/200 |
| 4,425,616 | 1/1984 | Woodell | 364/200 |
| 4,442,502 | 4/1984 | Friend et al. | 364/900 |
| 4,457,772 | 7/1984 | Haynes et al. | 364/473 |
| 4,478,629 | 10/1984 | Wood et al. | 364/483 |
| 4,481,570 | 11/1984 | Wiker | 364/200 |

OTHER PUBLICATIONS

Mikrocomputer fur Fernwirksysteme; Von Mazan; Technische Rundschau; Nr. 4, 1-23-79; pp. 13-15.
Die Fernwirk-Systemfamilie Ist 26/EZM26; ITT.

Primary Examiner—Jerry Smith
Assistant Examiner—Allen MacDonald
Attorney, Agent, or Firm—John T. O'Halloran; Jeffrey P. Morris

[57] ABSTRACT

A telecontrol system is disclosed whose substations contain a control unit and plug-in interface modules for entering messages or measured values and delivering commands. Both the control unit and the interface modules are equipped with microcomputers and connected via suitable interfaces to a common serial data bus. Because of the presence of the serial data bus, the parallel buses of the microcomputers need not leave the individual modules, which reduces the susceptibility to interference on the buses. In addition, the serial data bus makes it possible to use any form of protection coding, so that individual modules can even be located away from the substation. Each interface module consists of an invariant portion, which is of the same design in all modules, and a problem-adapted portion, whose design depends on the task to be performed.

3 Claims, 3 Drawing Figures

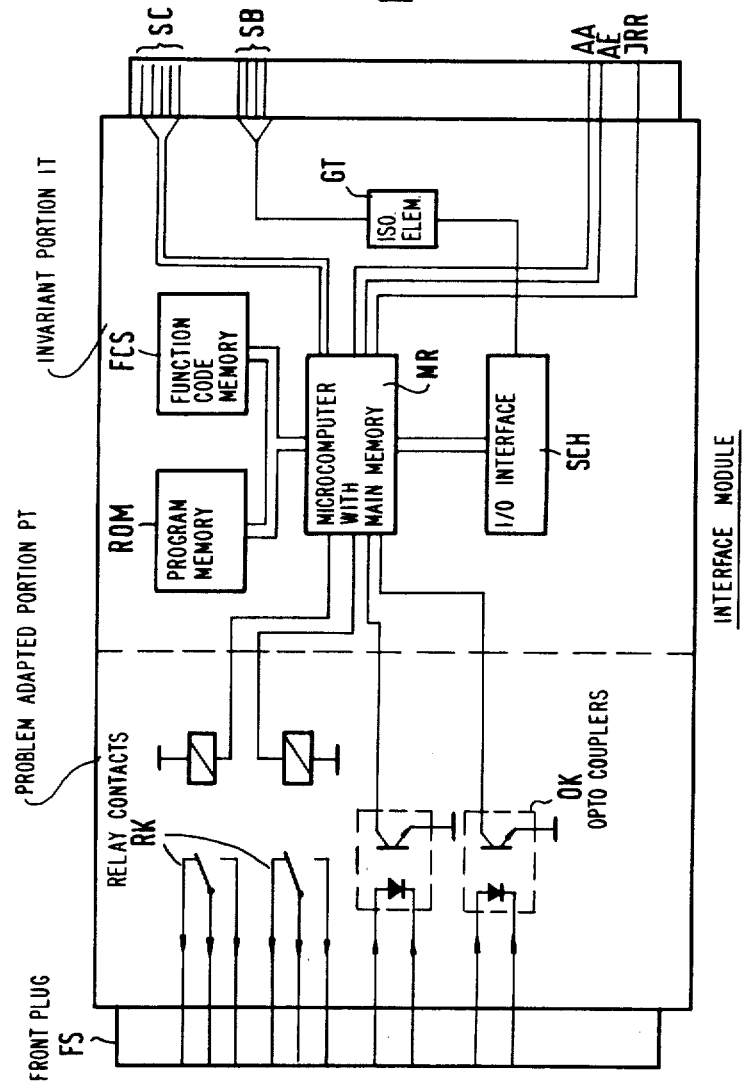

TELECONTROL SYSTEM

The present invention relates to a telecontrol system as set forth in the preamble of claim 1.

Telecontrol systems are used to remotely control and remotely monitor supply systems and communications networks and to control and monitor large industrial plants and complexes of buildings.

A telecontrol system of the above kind is described, for example, in a printed publication by SEL entitled "Die Fernwirk-Systemfamilie IST 26/EZM 26". FIG. 6 on page 15 and the description of this figure on pages 16 and 17 highlight the remote substation IST 26, whose control unit contains a microprocessor. Messages and commands are transferred into and out of this substation via buffers arranged on plug-in circuit boards (modules) and connected to the microprocessor of the control unit via a parallel microprocessor bus.

The use of the parallel microprocessor bus by many plug-in modules may be disadvantageous if the substation is located in a very noisy environment, e.g., near switched inductive loads. Even if isolating means are provided between the facilities to be monitored and the substation, electromagnetic interference may occur, which necessitates further expensive measures to eliminate this interference.

The telecontrol system according to the invention, which is described avoids this disadvantage by using a serial data link between the control units of the respective substations and the associated message-input/command-output modules (interface modules), so that the microprocessor bus need no longer leave the control-unit module. Unlike a parallel microprocessor bus, the serial data bus can be operated by methods which are largely insensitive to interference, and the information to be transmitted can be protected against errors by using any form of protection coding.

The insensitivity of the serial data bus also permits the individual interface modules to be located away from the substation, e.g., in the immediate vicinity of the object to be monitored or controlled.

Interference caused during operation by the removal of interface modules or by the insertion of additional interface modules into a substation can be suppressed as well, so that such action will not (lastingly) interfere with the operation of the substation, and the system need not be switched off when modules are added or removed.

Since each interface module has its own microcomputer, and the modules can be located away from the controlling computer of the substation, it is possible to transfer messages and/or commands to or from the master station without the need for an intervening substation as individual interface modules are connected directly to the computer of the master station via the serial bus. The interface modules then perform the function of a substation.

A development of the telecontrol system according to the invention relates to the division of the interface modules. This division into an invariant subcircuit, containing the microcomputer, and a problem-adapted subcircuit, containing the components necessary for adaptation to the facility to monitored or controlled, permits more economical fabrication of the interface modules (limitation of the variety of types) and in many cases, unless new specific adapting components are required, a subsequent change in the function of an interface module. Such a change in function can be made, for example, by reprogramming the function-code memory, i.e., without making any changes in the hardware of the module.

Another development of the telecontrol system according to the invention insures that both the substations and the master station know the addresses and functions of all inserted interface modules. Any unauthorized tampering with the telecontrol system, such as the removal of an interface module, will thus be detected immediately. Any transposition of a module to another socket (confusion of sockets) will also be noticed and will lead to a change in the module's address in the memories of the master station and the substation which will not interfere with the operation of the system.

Also described is a development of the telecontrol system according to the invention with which the registration of a newly inserted interface module is speeded up.

A further development of the telecontrol system according to the invention insures that any faulty interface module which interferes with the operation of the system and no longer responds can be disabled from the master station.

An embodiment of the telecontrol system according to the invention will now be described with reference to the accompanying drawings, in which:

FIG. 3 shows an interface module.

Figure 1:
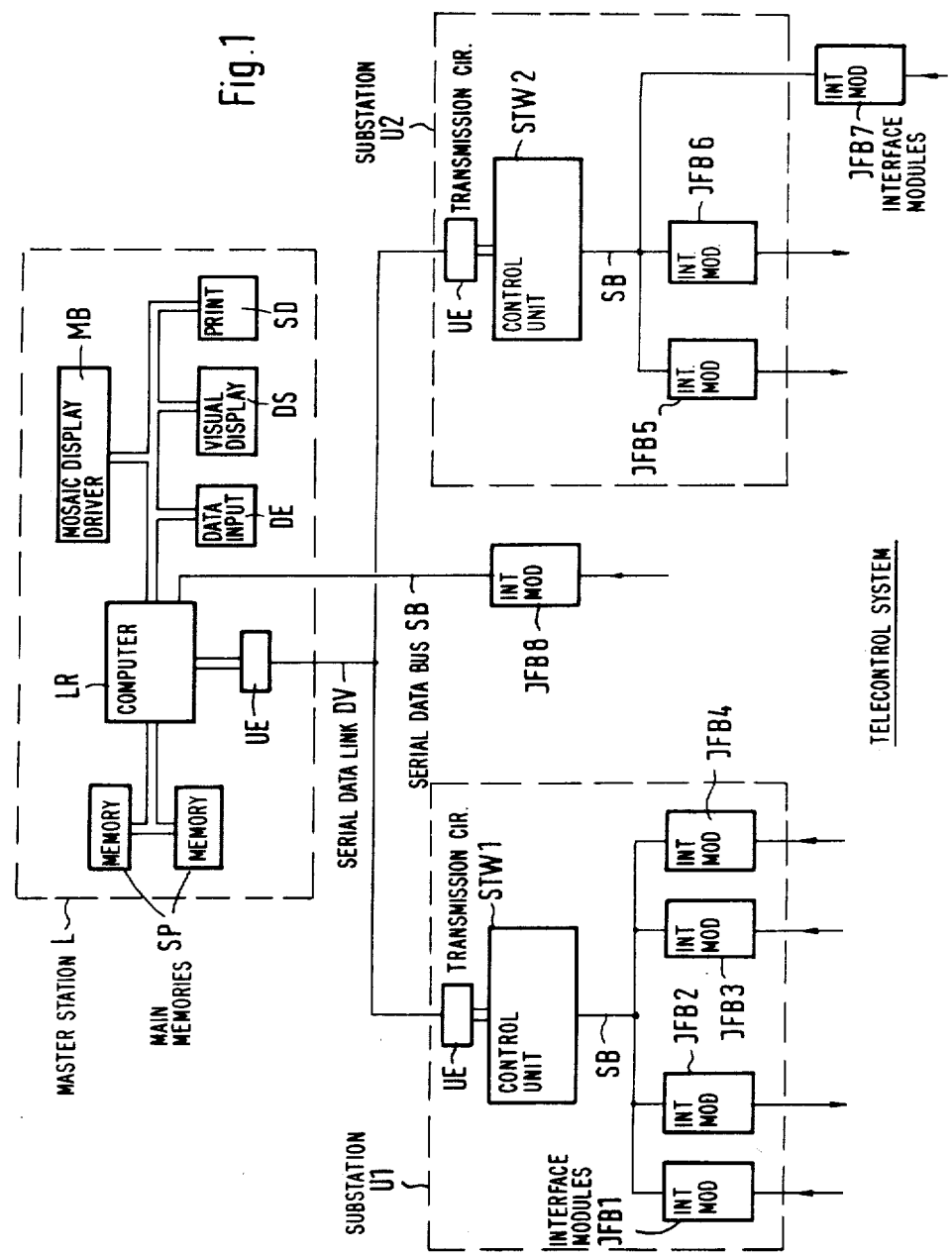
FIG. 1 shows schematically a telecontrol system according to the invention.

FIG. 1 shows a remote control system in accordance with the invention. It consists of a master station L and two substations U1, U2 each having several interface modules IFB1 to IFB7 associated with it. An additional interface module IFB8 is connected directly to the master station. The master station contains a computer LR with memories SP and peripherial equipment, such as data-input device DE, visual display unit DS, printer SD, and mosaic-display driver MB, which are necessary to perform the function of the master station. Data transmission between the master station and the substation takes place via transmission units UE, associated with the master station and the substations, and a serial data link DV. The transmission units are designed in the known manner depending on the transmission medium (wire, radio, optical waveguide) and the transmission method (VFT, PDM, PCM) used.

Each substation—depending on the degree to which the master station is equipped a nearly arbitrary number of substations can be connected to a master station—contains a control unit STW1, STW2 and a number of plug-in interface modules IFB1 to IFB7, each of which is assigned to a given message transmitter or command receiver in the facility to be monitored and/or controlled. In special cases, e.g., if very simple messages with a small information content have to be transferred, an interface module may also be associated with two or more message transmitters.

The control units of the substations and all interface modules contain microcomputers. The microcomputers of the interface modules of each substation are connected with one another and with the control unit of the respective substation via a serial data bus SB. This serial data bus, which is coupled to the microcomputers via standard interfaces conforming to EIA Recommendation RS 422, for example, permits both the interface modules to be cyclically scanned for temporarily stored messages and control commands to be transferred from the control unit to the interface modules and the devices associated therewith. The serial data transfer may take place in telegram form and permits the use of nearly all protection coding methods. The data transfer is thus considerably less sensitive to interference than if a parallel bus of the control-unit microprocessor were looped to all sockets of the substation, as is the case in the prior art. As the serial bus is insensitive to interference, the data telegrams can also be transferred over longer cable links, so that interface modules, such as the interface module IFB7 of FIG. 1, can be located away from the substation and mounted directly at the facility being controlled or monitored or, such as the interface module IFB8, can be connected directly to the computer of the master station without an intervening substation if this computer has a suitable interface.

The interface modules of a substation are addressed via their sockets, where a given number of contacts serves for address coding purposes. For example, 30 different addresses can be coded by binary connection of five contacts. By scanning these contacts, the microcomputer of a newly inserted interface module can obtain the address assigned to its socket, which it stores.

Figure 2:
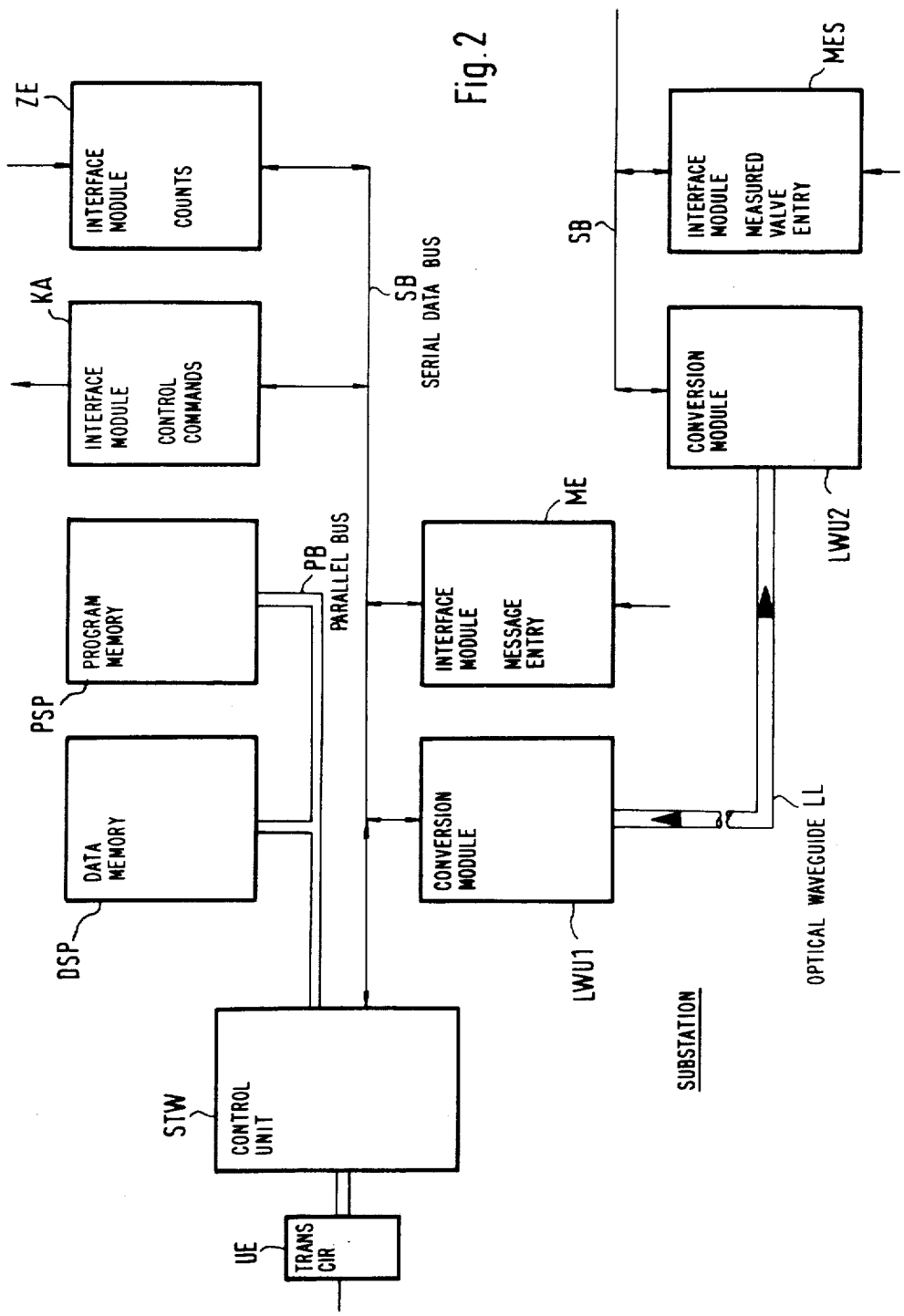
FIG. 2 shows a substation with interface modules.

FIG. 2 shows the construction of a substation in a block diagram. The control unit STW is connected to different interface modules KA, ZE, ME, MES by the serial bus SB. The interface modules perform different functions. The module KA serves to deliver control commands, e.g., to a switch (not shown) or a final control element (not shown), and the module ME serves to enter messages and senses, for example, the position of a switch. Further modules serve to enter measured values (module MES) or counts (module ZE). The serial bus, normally implemented as a cable link, can be readily interfaced to a different transmission medium. The substation of FIG. 2 contains a special conversion module LWU1, which converts the data telegrams transferred over the serial bus into light pulse sequences and puts the latter on an optical waveguide LL. At a remote location, the conversion module LWU2 converts the optical waveguide data telegrams back into the original electrical form. The transfer over optical waveguides makes it possible to run the serial bus through very noisy areas or into telecontrol areas which are under high tension. The data telegrams may also be converted into a form suitable for transmission over a radio or microwave radio channel if a cable link to the facility to be controlled or monitored is not possible (moving objects) or very expensive.

As another special feature, the substation of FIG. 2 has an additional data memory DSP and an additional program memory PSP. The memories are connected to the control unit by a parallel bus PB of the control-unit microprocessor and serve to expand the micorprocessor's memory and, thus, the substation.

FIG. 3 shows an interface module in a simplified representation. The interface module is pluggable and consists of an invariant portion IT and a problem-adapted portion PT. The invariant portion contains a microcomputer MR with program memory ROM and main memory (not shown). In addition, a function-code memory FCS is provided that can be programmed according to the desired function of the module (EPROM, coding plug). The invariant portion of the interface module further includes an input/output interface SCH which converts data delivered in parallel by the microcomputer into serial data and places the latter on the serial data bus SB via an isolating element GT. In the opposite direction, data arriving in serial form are converted into parallel data. Telegram processing and protection coding are performed by the microcomputer. The microcomputer also processes and stores the address determined by the pin coding. To this end, it scans pins SC reserved for the coding.

The problem-adapted portion PT of the interface module contains relay contacts RK for delivering demands, and optocouplers OK for entering messages. The relays are controlled by the microcomputer via output drivers (not shown). Both the relay contacts and the optocouplers provide reliable isolation between the interface module and the facility to be controlled or monitored. Their terminals are accessable via a front plug FS of the module.

The interface module has an interrupt output IRR via which the occupation of a socket is signaled to the control unit of the substation as soon as a newly inserted interface module reaches its full operating voltage. The control unit of the substation is thus activated to perform a scanning cycle covering all sockets.

Each interface module has a disable input AE and a disable output AA. The disable output of each module is connected to the disable input of an adjacent module. Thus, each interface module can disable an adjacent module and, in turn, can be disabled by another adjacent module. The disabling is effected in response to a command from the control unit if a module is found to operate incorrectly or to interfere with the operation of the system.

The above-described telecontrol system in accordance with the invention works as follows. The master station cyclically interrogates, via the data link DV, all substations connected to it for messages in accordance with a specified working program. If a message is stored in a substation, it will be communicated to the master station in a reply telegram. If no messeage is stored, the substation will respond with a status telegram which says that the substation is operating normally or is faulty.

An interrogation cycle similar to that between the master station and the substations but independent of the master station takes place between each substation and the interface modules associated with it.

The messages buffered in the interface modules are transferred into the memory of the control unit of the substation, where they are available for interrogation by the master station. All messages are stored with the address of the interface module from which they originate, and with the function code of this module. When the messages are transferred to the master station, the address of the substation is added to the address and the function code of the interface module. In this manner, the master station is informed of the origin of each message. It stores the addresses of the respective modules in the interface-module register. Since it is possible that empty sockets are scanned during the interrogation of the interface modules, a timing circuit must be present which, in the absence of a response to an interrogation of a socket, provides an indication that the socket is not occupied. By comparing this information with the contents of the interface-module register, the master station detects when a module has been removed.

To deliver control commands, the master station transmits a telegram with special identification which contains the addresses of the substation and the interface module of the switch or the final control element to be controlled. The interrogation cycles of the master station and the addressed substation are interrupted with this telegram, and are not continued until the control command has been delivered and an acknowledgement of the error-free reception of the control command has been sent from the interface module to the master station.

The computer system of the master station continuously evaluates all stored messages and indicates the status of the facilities to be monitored and/or controlled on a visual display unit. Data, e.g., control commands, can be entered manually via a data-entry keyboard. Any faults are printed out on a printer.

If an interface module is connected to the master station direct, e.g., without an intervening substation, the latter will be interrogated via the serial bus SB between the master-station computer and the interface modules.

The lengths of the data telegrams to be transferred between master station and substation and between substations and interface modules may be different.

We claim:

1. A telecontrol system with at least one master station and a plurality of substations connected to the master station via data transmission units, each substation containing a control unit equipped with a microcomputer and a plurality of plug-in interface modules connected to the control unit and serving to enter messages and measured values and to deliver commands, wherein said interface modules are equipped with microcomputers, and that both the control unit and all interface modules of a substation have interfaces to, and are interconnected by, a serial data bus permitting the use of protection coding techniques wherein each interface module has a first subcircuit which includes said microcomputer, and is coupled to said control unit by a serial data bus over which said interface module is cyclically scanned for temporarily stored messages; and a second subcircuit for providing isolation between said interface module and a facility to be monitored, and wherein said first subcircuits in all interface modules are of the same design and contain, besides the microcomputer with main memory and program memory and the interface to the serial data bus, a function-code memory in which the function of the respective interface module can be fixed by coding, and wherein said second subcircuit includes all components necessary for adaptation to the technical facility to be monitored and controlled.

2. A telecontrol system as claimed in claim 1 characterized in that the master station and the control units of the substations have interface-module registers in which the function code of all inserted interface modules and an address assigned to the socket used are stored.

3. A telecontrol system as claimed in claim 2, characterized in that the interface modules have disabling devices each of which is connected to and controllable from an adjacent interface module.

* * * * *